United States Patent
McCrary et al.

(10) Patent No.: US 7,171,867 B2
(45) Date of Patent: Feb. 6, 2007

(54) MULTI-CLUTCH SYSTEM WITH BLENDED OUTPUT SYSTEM FOR POWERTRAIN TRANSMISSIONS

(75) Inventors: Paul T. McCrary, Belleville, MI (US); Karl-Heinz Bauer, Graben-Neudorf (DE)

(73) Assignee: BorgWarner Inc., Auburn Hills, MI (US)

( * ) Notice: Subject to any disclaimer, the term of this patent is extended or adjusted under 35 U.S.C. 154(b) by 189 days.

(21) Appl. No.: 10/958,798

(22) Filed: Oct. 5, 2004

(65) Prior Publication Data

US 2005/0072255 A1    Apr. 7, 2005

Related U.S. Application Data

(60) Provisional application No. 60/508,922, filed on Oct. 6, 2003.

(51) Int. Cl.
*F16H 3/08* (2006.01)
(52) U.S. Cl. .................................................. 74/331
(58) Field of Classification Search ............... 74/331, 74/330; 192/48.8, 106 F
See application file for complete search history.

(56) References Cited

U.S. PATENT DOCUMENTS

| | | | |
|---|---|---|---|
| 3,589,483 A | 6/1971 | Smith | |
| 3,823,802 A | 7/1974 | Winseler et al. | |
| 4,463,621 A | 8/1984 | Fisher | |
| 4,741,422 A | 5/1988 | Fuehrer et al. | |
| 4,947,974 A | 8/1990 | Smemo et al. | |
| 4,964,504 A | 10/1990 | Friedmann | |
| 4,966,270 A | 10/1990 | Rispeter et al. | |
| 5,630,492 A | 5/1997 | Yoshikawa et al. | |
| 5,887,690 A | 3/1999 | Haupt | |
| 5,915,512 A * | 6/1999 | Adamis et al. ............ | 192/3.61 |
| 6,382,382 B1 | 5/2002 | Avny et al. | |
| 6,401,894 B1 | 6/2002 | Merkel et al. | |
| 6,454,074 B1 * | 9/2002 | Kundermann et al. ... | 192/87.11 |
| 6,464,059 B1 | 10/2002 | Kundermann et al. | |
| 6,491,149 B1 | 12/2002 | Kundermann et al. | |
| 6,523,657 B1 | 2/2003 | Kundermann et al. | |
| 6,634,477 B2 | 10/2003 | Beneton et al. | |
| 6,860,373 B2 | 3/2005 | Kundermann et al. | |

(Continued)

FOREIGN PATENT DOCUMENTS

DE    10115454 A1    8/2002

(Continued)

*Primary Examiner*—Dirk Wright
(74) *Attorney, Agent, or Firm*—Fitch, Even, Tabin & Flannery; Greg Dziegielewski (57) ABSTRACT

A transmission system is provided utilizing multiple sets of clutch friction elements, each engaged to transfer torque from a torque input, such as an engine, to different gear ratios. The sets of clutch friction elements are operated simultaneously to provide a blended, gear ratio to a drivetrain. By varying the engagement of the clutch elements, and thus the proportion of the torque transferred to the gear ratio associated with each set of friction elements, an intermediate, effective gear ratio is developed. This effective gear ratio can be increased or decreased in response to external stimuli, such as vehicle and/or engine sensors, by modifying the degree of engagement of each set of clutch friction elements, and thus the proportion of torque transferred by each set of elements to its associated gear ratio.

17 Claims, 7 Drawing Sheets

U.S. PATENT DOCUMENTS

| | | |
|---|---|---|
| 6,868,949 B2 | 3/2005 | Braford, Jr. |
| 6,881,171 B2 * | 4/2005 | Kuhstrebe et al. ............. 477/78 |
| 6,887,184 B2 * | 5/2005 | Buchanan et al. .......... 477/174 |
| 6,929,107 B2 | 8/2005 | Hegerath |
| 7,048,672 B2 * | 5/2006 | Bothe et al. ................ 477/110 |
| 2001/0035328 A1 | 11/2001 | Tanikawa |
| 2003/0116396 A1 | 6/2003 | Kuhstrebe |
| 2004/0206599 A1 | 10/2004 | Hegerath |
| 2005/0067251 A1 * | 3/2005 | Braford et al. .......... 192/70.12 |
| 2005/0072255 A1 | 4/2005 | McCrary et al. |
| 2005/0082136 A1 | 4/2005 | Bradford, Jr. et al. |
| 2005/0189195 A1 | 9/2005 | Heinrich et al. |

FOREIGN PATENT DOCUMENTS

| | | |
|---|---|---|
| DE | 10115453 A1 | 10/2002 |
| DE | 10203618 A1 | 2/2003 |
| EP | 0321873 B1 | 6/1999 |
| EP | 1195537 A1 | 4/2002 |
| EP | 1378679 A2 | 1/2004 |

* cited by examiner

Fig. 5A — TORQUE RATIO BLENDED LAUNCH, NORMAL

Fig. 5B — TORQUE RATIO BLENDED LAUNCH, PERFORMANCE, HIGH LOAD CONDITIONING

Fig. 5C — TORQUE RATIO BLENDED LAUNCH, ECONOMY, WINTER

Fig. 9

| 25% THROTTLE LAUNCH | TIME 0-20 MPH | GRAMS FUEL 0-20 MPH | TIME 0-100 FEET | GRAMS FUEL 0-100 FEET | NUMBER SHIFTS IN 100 FEET |
|---|---|---|---|---|---|
| 1ST GEAR RATIO LAUNCH, SHIFT TO 2ND GEAR RATIO, SHIFT TO 3RD GEAR RATIO (PRIOR ART) | 3.53s | 9.73gm. | 4.75s | 12.99gm. | 2 |
| 2ND GEAR RATIO LAUNCH, SHIFT TO 3RD GEAR RATIO (PRIOR ART) | 4.1s | 11.04gm. | 5.2s | 14gm. | 1 |
| BLENDED RATIO LAUNCH, 1ST GEAR RATIO & 2ND GEAR RATIO, SHIFT TO 3RD GEAR RATIO | 3.41s | 9.34gm. | 4.72s | 12.84gm. | 1 |

MULTI-CLUTCH SYSTEM WITH BLENDED OUTPUT SYSTEM FOR POWERTRAIN TRANSMISSIONS

This application claims the benefit of Provisional application Ser. No. 60/508,922, filed Oct. 6, 2003.

FIELD OF THE INVENTION

The invention relates generally to powertrain transmissions utilizing two or more clutch systems, such as those used in automotive multi-clutch transmissions.

BACKGROUND

One form of powertrain transmissions utilizes a multiple clutch system to transmit torque from an input source, such as an engine or motor, to a gear box or other gear shifting mechanism, which in turn transfers torque and rotational speed to a drivetrain. Such multi-clutch systems may be used in manual, an assisted manual or automatic transmissions. One type of multi-clutch system is a dual clutch transmission such as those used in automotive applications. Dual clutch transmissions typically are provided with a single torque input from the engine that is transferred by the clutch to one of a pair of shafts out of the clutch to the transmission gear box.

The torque input is transferred to the output shafts through a pair of selectively engageable, compressible sets of clutch friction elements, such as stacks of clutch disks. One example of such a dual clutch system has a first and a second clutch friction element or clutch stack, and, where disk stacks are used, each stack has a set of driving disks and a set of driven disks. The driving disks are operatively connected to the torque input, and the driven disks are operatively connected to one of the output shafts. In the gear box, the output shafts provide torque to different gear sets, providing different gear ratios to the drivetrain.

In such a system, one of the clutch stack/output shafts can provide torque to the even numbered gear ratios in the transmission and the other shaft can provide torque to the odd numbered gear ratios and a reverse gear. Other multi-clutch systems typically provide a similar arrangement of multiple clutch friction elements providing torque transfer to preselected output shafts/gear ratio combinations.

By selectively operating the clutch friction elements, the operator or operating system can frictionally engage the driving elements and the driven elements to transmit torque to preselected gear ratios. The amount of torque transfer will depend on the degree to which the driving and driven friction elements are engaged, the engine speed and other related factors. Because one set of friction elements is engaged while the other set(s) is inactive, additional gear ratios may be selected in the transmission and engaged to the output shaft(s) connected to the inactive clutch friction elements. The gear shift is accomplished by disengaging the active set of friction elements and activating the selected inactive set that is already engaged with a new gear. Thus, the time required to shift to the new, pre-selected gear ratio can be reduced, clutch engagement and disengagement interruptions can be reduced, and a smoother gear shift can be accomplished.

In "wet" clutch systems, a consistent flow of an oil, transmission fluid or other lubricating fluid, also is maintained through the clutch. The lubricating fluid flows through supply channels and through the clutch friction elements providing lubrication to the friction elements, seals and other moving parts. This fluid flow reduces friction wear on the friction elements and further serves an important role in cooling the clutch and the friction elements.

Many multi-clutch systems position the sets of friction elements, e.g. clutch disk stacks, radially with respect to each other. In other systems, the sets of clutch friction elements are positioned parallel to each other along the principal axis of rotation of the clutch mechanism. Other arrangements also may be used depending on the number of sets of clutch friction elements, space concerns, efficiency concerns, etc.

In many multi-clutch systems, the clutch output shafts are concentrically arranged with respect to each other. One example of such an arrangement in a dual clutch system uses a first inner clutch output shaft connected to one of the clutch disk stacks and positioned within a hollow second, outer clutch output shaft, that is connected to the other clutch disk stack. The selective activation of either the first or the second clutch stacks allows for the torque input from, for example, an engine drive shaft to one of the inner or outer output shafts.

In such a system, each clutch stack can be hydraulically activated by radially extending annular pistons. The pistons often extend from a location proximate a clutch support to the outer clutch plates of each of their clutch stacks. The pistons together with an annular cylinder and/or inner walls of the clutch define a pressure chamber for each piston. When a flow of fluid (typically transmission oil) is applied to the pressure chamber and thus to one of the pistons, the piston contacts the clutch stack with a force sufficient to compress and frictionally engage the discs of the clutch stack. In such systems, accordingly, when one stack is engaged the other is inactive, and shifts are discrete events made as quickly as possible A microprocessor controller frequently is used to operate the clutch systems, and alone or in co-ordination with one or more other controllers such as those directing the selection of specific gear ratios in the transmission, engine controllers, etc. For example, a microprocessor controller may be used to direct the application of pressure to the disk stacks, the supply of cooling and lubrication fluids to the disk stacks, and the shifting of gears in the gearbox, etc.

The overall performance of a transmission often is evaluated in several respects. Some factors involve objective measurements, such as torque transfer efficiency, shift time, the clutch and/or gear endurance and durability, shift efficiency and duration, potential fuel savings, etc. Other factors are more subjective, such as shift noise, shift busyness (i.e. number of shifts for a given time period/condition), shift timing, shift stiffness, etc. In manual transmissions, many of these considerations are subject to the operator's direct control. In automatic transmissions and partially automatic transmissions factors such as shift timing, shift busyness, etc. are subject to the controller system, the gear ratios, and other mechanical or electromechanical systems in the transmission.

The balancing of these factors often results in compromises necessary to satisfy specific design criteria, cost considerations and criteria unrelated to the function and operation of the transmission. For example, automatic transmissions can require a relatively broad range of gear ratios to provide adequate load bearing capacity at a vehicle start up using a first or second gear, and to provide high speed travel capabilities at a fourth, fifth or sixth gear.

Standard manual transmissions, and some semi-manual transmissions, with a comparable range of gear ratios often require undesirable, rapid shifting at relatively low vehicle speeds, particularly when the vehicle is launched from a stop or near launch speeds. This undesirable "shiftiness" also can be present in dual clutch transmissions with such a range of gear ratios. Such undesirable "shiftiness," in addition, can occur where a manual transmission is replaced by a dual clutch automated transmission or other automated transmissions.

Accordingly, in many multi-clutch systems, the gear ratios necessary under heavy load conditions, such as towing a trailer, are unnecessary under no-load conditions, but nevertheless are used to satisfy the operational demands for the transmission. For example, when the vehicle is launching, or starting from rest, the high ratio first gear often is needed only for a brief time, normally for seconds, and then the transmission typically is shifted to the next, higher gear ratios. A similar shifting occurs when a vehicle under load (e.g. from cargo or towing a trailer) is traveling at a very slow speed and rapid acceleration is required.

Such conditions can produce an undesirable "busy" shifting routine, particularly if the transmission controller senses changing loads or speeds requiring shifting repeatedly between a first gear to a second or higher gear. The resulting noise and vibrations induced due to such shifting operations is undesirable for many applications.

One approach to addressing this issue has been to use a higher gear (and lower gear ratio) for vehicle start up or launch conditions, and for similar conditions requiring greater torque transfer to a drive train. This approach, however, is unsuitable for many applications, particularly those where the drive train load conditions and torque needs are variable, and where the vehicle/drive train loads may cause engine stalling or damage at those gear ratios.

The operating inefficiencies that result from the use of gear ratios that are not well matched to specific driving conditions, i.e. high gear ratios in first or second gears, also can result in undesirable losses in fuel economy, transmission and/or powertrain durability, etc. For example, at start up and thereafter, unnecessarily high gear ratios will result in use of excessive engine speeds to achieve desired rates of speed or speed increases. Similarly, the use of gear ratios that are too low for a particular load and vehicle condition will result in engine inefficiencies causing a reduction in fuel efficiencies and potential engine damage.

SUMMARY OF THE INVENTION

The invention provides a new and improved transmission system utilizing multiple sets of clutch friction elements, each engaged to transfer torque from a torque input, such as an engine, to different gear ratios. The sets of clutch friction elements are operated simultaneously and are adjusted to provide a blended, gear ratio to a drivetrain. The blended, effective gear ratio is achieved by utilizing the sets of clutch friction elements as non-rigid, controlled slipping connections. By varying the engagement of the clutch elements, and thus the proportion of the torque transferred to the gear ratio associated with each set of friction elements, an intermediate, effective gear ratio is developed. This effective gear ratio can be increased or decreased by modifying the degree of engagement of each set of clutch friction elements, and thus the proportion of torque transferred by each set of elements to its associated gear ratio.

In another aspect, the invention provides a control system and method that utilizes one or more feedback loops from sensors to a controller to permit continuous adjustments to the effective gear ratio produced by the multiple clutch stack-friction element combinations. In this aspect, the controller uses one or more microprocessors or its equivalent to monitor sensor input, such as operator directions, vehicle speed, engine speed, accelerator position, transmission load, wheel speed and vehicle loading as criteria to determine whether the effective gear ratio provided by the multiple clutch-gear ratio should be increased or decreased to satisfy specified conditions.

The control system, in yet another aspect of the invention, may be programmed with preferred criteria for the operation of aspects of the system such as a range of acceleration, vehicle speed rates, engine speed, acceleration rates, etc., as well as safety criteria such as clutch temperature, wheel spin, engine temperature, etc. Using input from the operator (such as throttle position) and data from the sensors monitoring such system aspects, the processor can adjust the control signals to the clutch friction elements to increase or decrease the torque flow from each set of friction elements and thus the net or effective output speed ratio from the two gear ratios engaged with each set of friction elements operating in tandem. Other criteria also may be used to determine the effective gear ratio produced by the blended clutch stack output, such as those optimizing fuel efficiency, torque output by the drive train, acceleration from launch, etc.

The system and method of the invention, in another aspect, may be used in automotive applications to optimize the launch of a vehicle from rest or slow movement conditions. In this aspect, the system engages a first set of clutch friction elements associated with a first gear having a relatively high gear ratio, and a second set of clutch friction elements associated with a lower gear ratio. The engine speed is typically increased to supply torque to the dual clutch. The first clutch is partially engaged to transmit a majority of the torque input, for example 60%, and the second clutch is partially engaged to transmit a minority of the input torque, for example 40% of the input to produce a blended or effective gear ratio to the drive train.

Thus, the effective gear ratio is lower than the first gear ratio and greater than the second gear ratio, and can be increased or decreased by increasing or decreasing the proportional input from each clutch. Using the effective gear ratio so produced, the vehicle is accelerated from a launch condition at a rate determined by the operator or by the control system.

As the acceleration continues, the controller may call for a lower effective gear ratio first clutch engagement to reduce the torque flow to its associated gear ratio, and the engagement of the second clutch stack to modify torque flow to the second gear ratio. Once the vehicle has accelerated to a speed greater than that appropriate for the first gear ratio, the first clutch and first gear ratios are disengaged. A third gear ratio then is selected and associated with the first clutch stack for the next gear shift at higher speeds.

Thus, under low vehicle loads, the vehicle may be accelerated rapidly and efficiently with the minimal number of gear shifts, and such shifts will be smoother and less "busy" than other systems. Under high load conditions, the system and method of the invention provides for the supply of a relatively high gear ratio that will be reduced more slowly than under light loads to provide more torque transfer to the drivetrain.

In another aspect, the invention provides a clutch system for a powertrain transmission having at least one controller in communication with a plurality of clutch friction assemblies. Examples of such clutch assemblies are friction disk stacks or other such friction assemblies suitable for receiving torque from an input source, such as an engine drive shaft or torque converter and transmitting torque to a plurality of gear ratio elements. The controller also is in communication with the gear ratio elements, which may be one or more combinations of gears (each with a different gear ratio) engageable with an output shaft. The gear ratio elements further are engageable with a torque output from one of the corresponding clutch friction assemblies, such as a clutch output shaft.

When engaged, each gear ratio element thereby forms a torque path from the clutch friction assemblies to a driving output, such as a drive shaft, a drive train or other driven assembly. The system, in this aspect, also includes at least one torque input sensor providing a signal indicative of the torque input to the clutch friction assemblies. Such sensors, for example, may include an engine speed sensor, throttle sensor, an accelerator pedal position sensor, or other such as sensors. The system, in this aspect, also may include one speed sensor providing a signal indicative of the driven assembly speed, such as a vehicle speed or wheel speed sensor.

The microprocessor of the controller provides control signals to the gear ratio elements. Such control signals cause selective engagement of one or more gear ratio elements with the torque output from the clutch friction assemblies and the transmission output to the drivetrain. Thus, in one example, the transmission control system will cause the engagement of a first gear with the output shaft from a first clutch assembly and with a transmission output shaft to the drivetrain. The control system also may cause the engagement of a second gear and the output shaft from a second clutch assembly and with the transmission output shaft.

The controller, in addition, provides signals to the first and the second sets of clutch friction elements controlling the engagement of each set of friction element assemblies, and thus the amount of torque transferred by the clutch assemblies. The clutch control system may be integral to the controller or may be part of a separate electronic and fluid control system operating with the controller. Upon receiving stimulus from an operator or other controllers, the clutch controller signals, electronically or with changes in fluid pressures, the first and second clutch friction elements engage and transfer an amount of torque to the first and second gear ratio elements, respectively, effective to provide the desired blended transmission gear ratio output. The controller monitors the input from the sensors and, based on that feedback, adjusts the torque output from each set of clutch friction elements, increasing or decreasing that output as necessary, to obtain, or maintain a desired gear ratio output and/or acceleration rate.

BRIEF DESCRIPTION OF THE DRAWINGS

FIGS. 5A to 5C are plots of engine speed versus vehicle speed for different clutch systems, including variations on the blending of clutch torque to produce effective gear ratios.

It should be understood that the above figures are not necessarily to scale. In certain instances, details of the actual structure shown in the Figures which are not necessary for the understanding of the present invention have been omitted. It should also be understood that the Figures are provided to illustrate an example of the invention and that the invention is not necessarily limited to the particular example and aspects discussed herein.

DETAILED DESCRIPTION

Figure 1:
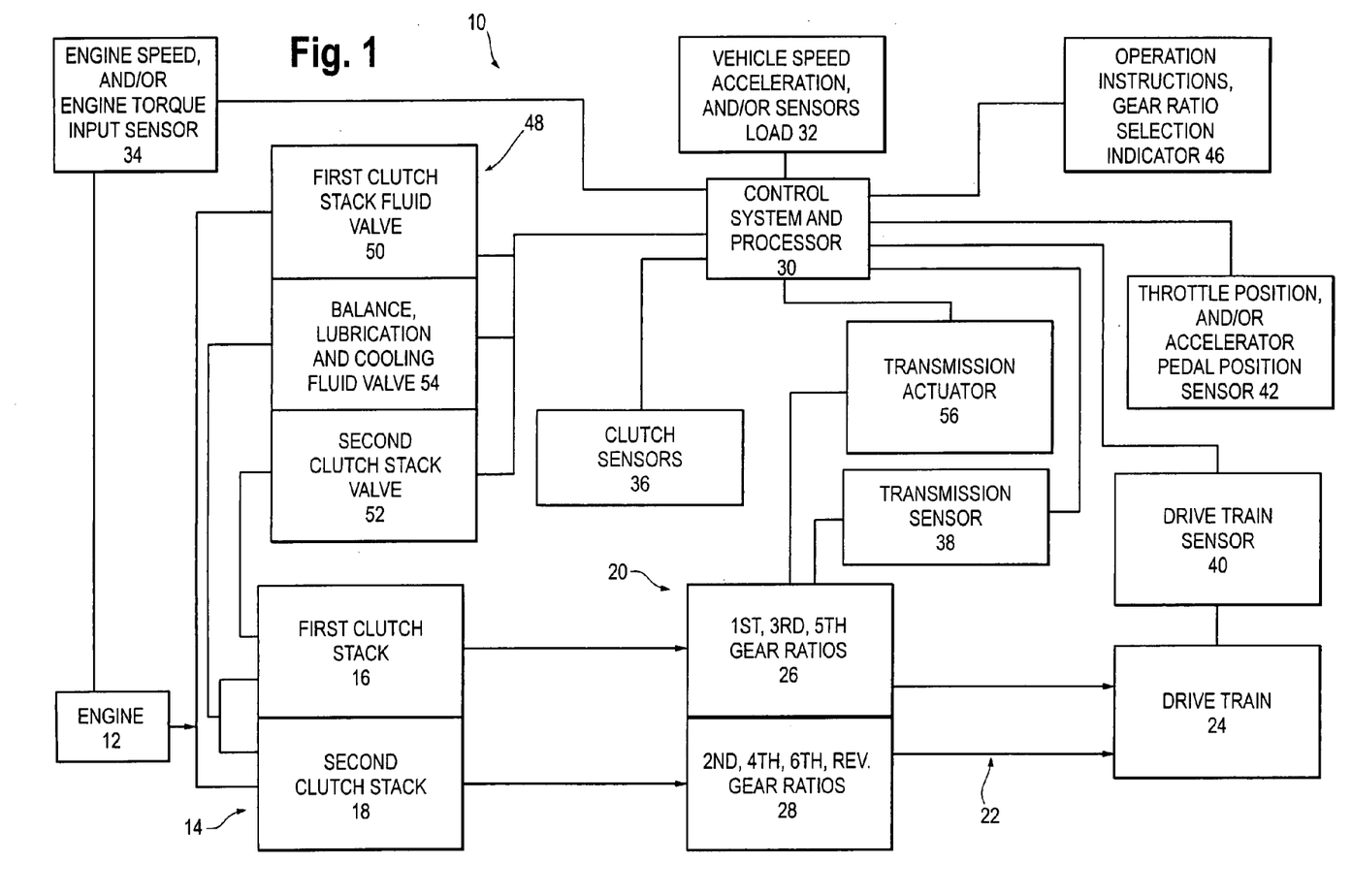
FIG. 1 is a block diagram representation of the transmission system of the invention reflecting clutch control systems and torque transfer from a torque source, such as an engine, through a dual clutch assembly and transmission to a drivetrain.

One example of the invention is illustrated in the block diagram of FIG. 1, for an automotive powertrain system 10. In such a system, a torque input source 12, which in this example is an automotive engine, supplies torque to a multi-clutch system 14 through a drive shaft, torque converter, damping system or other transfer systems. Other torque input sources, such as electric motors, hybrid electric motor and internal combustion engine systems, etc. may be used.

As used herein, references to "gear ratio" generally shall refer to a system or system element input torque and/or speed relative to the system or system element torque and/or speed output unless otherwise indicated by the usage context. For example, a transmission gear ratio, or transmission gear ratio output refers to the engine torque input to a clutch and transmission system relative to the transmission gear or transmission system output.

In this example, the multi-clutch system 14 comprises a first clutch stack 16 and a second clutch stack 18. As discussed with reference to FIGS. 1 and 2, the clutch stacks 16 and 18 typically are independently operable assemblies of driving disks receiving torque from the input source 12. The driving disks engage driven disks to transfer the torque from the clutch system 14 through a clutch output, such as an output shaft to a transmission 20. In this aspect of the invention, each of the clutch stacks 16 and 18 are provided with separate output shafts to the transmission 20.

As discussed with reference to FIG. 2, the transmission 20 is provided with a series of gear ratio elements, typically individual gears, each providing a different speed reduction gear ratio or torque output ratio. Each gear ratio element is engageable with a transmission output 22, typically a drive shaft to the drive train 24, to form a torque path from the torque input 12 to the transmission output 22. A drive train 24 receiving the transmission output, drives the movement of the vehicle or other assembly. The range of the speed reduction ratios and/or torque output ratios included in the transmission 20 will depend on the specific gears or gear elements selected for the transmission 20.

Figure 2:
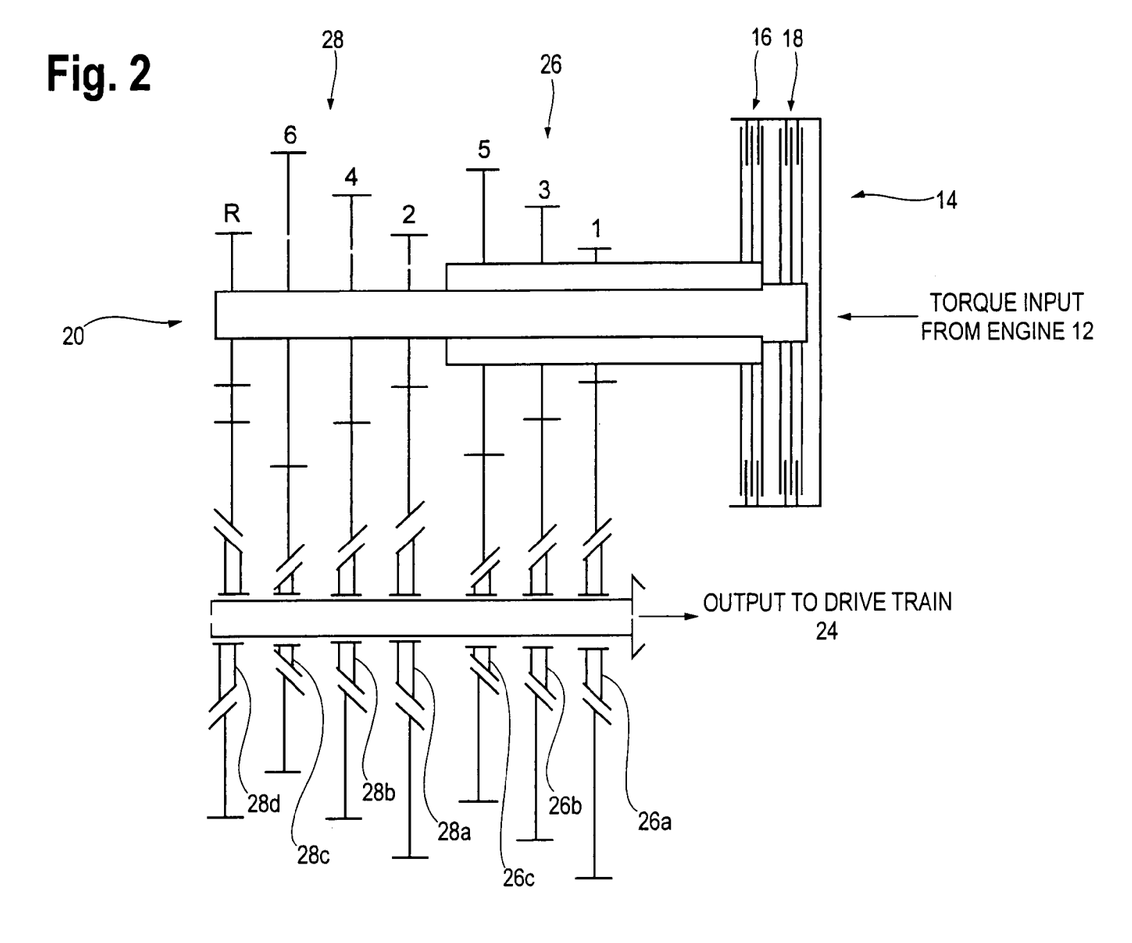
FIG. 2 is a schematic representation of one example of the clutch, transmission and drivetrain relationship of the system shown in FIG. 1 reflecting the operative relationship between a dual clutch assembly and a manual, semi-automatic and automatic transmission in such a system.

In the example shown in FIGS. 1 and 2, the output from the first disk stack 16 is associated with a first set of gear ratio elements 26. In this example, the gear ratios are a first 26a, third 26b and fifth 26c gear ratio. The output from the second disk stack 18 is associated with a second set of gear ratio elements 28, with a second 28a, fourth 28b, sixth 28c and reverse 28d gear ratios. The speed reduction ratio of the first gear 26a typically is relatively high compared to the ratios of the other gear elements to provide greater power and/or torque to the drivetrain 24 at slower speeds. The sixth gear ratio 28c typically provides the lowest gear ratio to permit the operation of the drivetrain at high speeds with lower engine speeds. For further operations, obtain greater fuel efficiencies at high vehicle speeds and similar advantages.

The distribution of speed reduction ratios for each gear element will depend on the particular application. For vehicles or systems that typically encounter high load conditions, the first and/or gear ratios may be significantly higher than the fourth and fifth gear ratios. Similarly, if low load or other conditions permit, the speed reduction ratios may extend over a smaller range.

The clutch system 14 and transmission system 20 are controlled by a control system 30 that is provided with signals from a variety of sensors and control input from the operator. Based on those signals and predetermined criteria, the controller provides control signals to the clutch system 14 and the transmission 20. The control system typically includes a programmable microprocessor and memory storage suitable for receiving and executing software directions, and for receiving and storing sensor data utilized by the software.

In some applications, other control systems capable of receiving input signals and providing responsive output signals to the clutch system 14 and the transmission system 20 may be used, such as electrical, fluid or electromechanical control systems. The control system 30, in addition, may be a separate system independent of other operating systems in a particular application, or it may be a sub-system incorporated in an operating system carrying out other functions as well.

In the example shown in FIGS. 1 and 2, the control system 30 is provided with sensor signals from one or more sensors providing data indicative of certain operations of the automotive vehicle using the invention 10. As shown as examples in FIG. 1, this may include sensors indicating the vehicle conditions such as vehicle speed, acceleration and/or load; the engine torque or speed 34; clutch position, engagement, temperature, etc. 36; the transmission and gear ratio element condition and/or selection 38; drive train speed, load, etc. 40; and throttle position or accelerator pedal position 42. The control system may also receive signal data from a source of operator instructions and/or gear ratio selection from the indicator(s) 46, such as those reflecting gear ratio selections by the vehicle operator.

In one aspect of the invention, the control system 30 processes the signals received from the sensors and indicators 34 through 46, and, applying an appropriate algorithm, transmits control signals to a clutch actuator system 48 which may include hydraulic electromechanical or other control devices. In this example, the clutch actuator system 48 includes a fluid pressure delivery system having a fluid reservoir and pump (not shown) and control valves 50, 52 and 54, directing a pressurized fluid flow to the clutch system 14. As discussed with reference to FIG. 1, the fluid flow pressure from the valves 50 and 52 causes the engagement, partial engagement and/or disengagement of each clutch stack 16 and 18. The valve 54 controls the flow of fluid to balance chambers in the clutch stacks and to lubrication and cooling paths through the clutch stacks 16 and 18.

The control system 30 also provides control signals to a transmission actuator 56 that causes the engagement of the gear ratio elements 26 and 28 with the output from the clutch stacks 16 and 18 and transmission output 22, which may be a drive shaft to the drive train 24. The transmission actuator 56 and transmission 20 cooperate to engage one gear ratio element 26 or 28 with the output from one of the clutch stacks 16 or 18 and the transmission output 22. The transmission actuator 56 and transmission 20 can simultaneously engage another gear ratio element with the output from the other clutch stack, and with the transmission output 22.

Thus, the controller 30 can direct the activation of one clutch stack and gear ratio to transfer torque from the engine 12 to the drive train 24, while the other clutch stack and gear ratio combination is inactive. When a shift in gears is desired, the first clutch stack/gear ratio can be disengaged and second clutch stack/gear ratio can be engaged. Alternatively, the controller 30 can direct the simultaneous engagement of each clutch stack 16 and 18 to provide a torque transfer through both engaged gear ratio elements 26 and 28.

The proportion of torque transferred to the gear ratio elements 26 and 28 is dependent on the extent of engagement of each clutch stack 16 and 18. By partially engaging the clutch stacks 16 and 18, the controller 30 can adjust the amount of slip in each clutch stack 16 and 18 permitting the controller 30 to vary the percentage of torque transferred by each clutch stack to each gear ratio element 26 and 28, and the effective gear ratio output of the transmission 20. Thus, based on the input signals from the sensors and vehicle operator, the controller 30 can direct a gear ratio and/or torque output to the drive train 24 over a blended range from the highest gear ratio, such as a first gear in this example, to the ratio of the next selected, lower gear ratio, such as second gear in the example.

The intermediate effective gear ratios are provided by the partial, simultaneous engagement of the clutch stacks 16 and 18. That intermediate ratio can decrease with the reduction in engagement of a clutch stack associated with the higher gear ratio, for example 16, and an increase in the engagement of the clutch stack associated with the lower gear ratio, for example 18.

The control system 30 also adjusts the amount of engagement of the clutch stacks in view of sensor input reflecting the engine speeds. The amount of torque input into the clutch 14 is dependent on the engine speed, and will affect the amount of torque available for transfer to the transmission 20 by the combined clutch stacks 16 and 18. Moreover, as the rotational speed of the clutch stack engaged with a higher gear ratio synchronizes with the engine speed, the controller commonly will disengage that clutch stack, shifting all of the torque transfer to the second clutch stack, and lower gear ratio. Shifting at that stage will reduce the tendency for the first clutch stack/higher gear ratio to create a resistance or braking action on the system as the vehicle speed increases.

Figure 3:
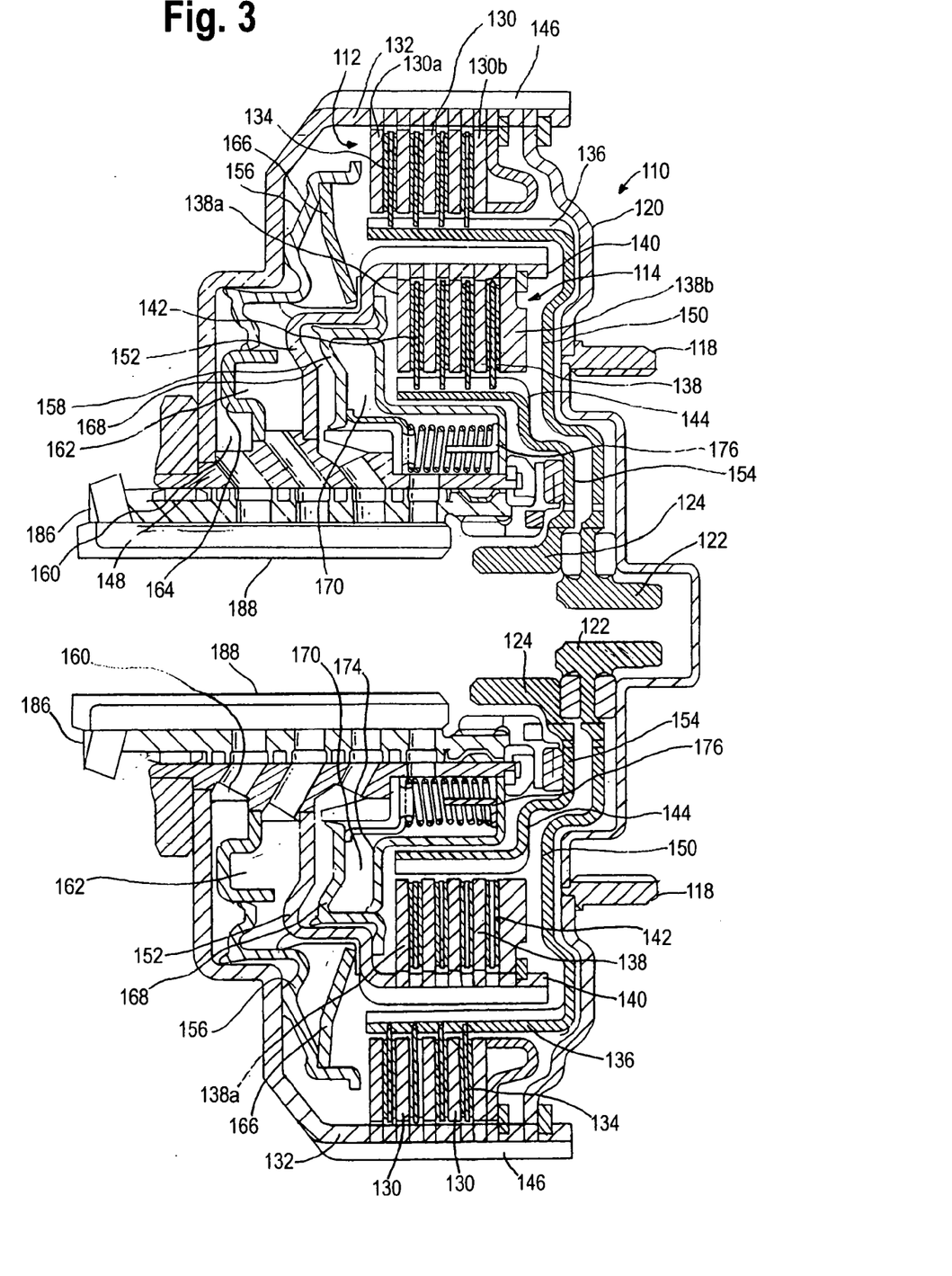
FIG. 3 is a partial side elevation, cross sectional view of one example of a dual clutch assembly that may be used in the system of FIG. 2.

FIG. 3 illustrates one example of a multi-clutch system, in this aspect a dual clutch system 110, suitable for use in the invention. In this system, the engagement of the clutch stacks may be increased or decreased pursuant to the clutch control system 30 signals to the clutch actuator 48. Moreover, the dual clutch 110 has a radial arrangement of the clutch stacks. Multi-clutch systems with parallel clutch stacks or other types of multi-clutch arrangements.

The dual clutch 110 with a first outer clutch disk stack 112 and a second inner clutch disk stack 114. The clutch includes a drive input hub 116 to receive a torque input from an engine draft shaft, fly wheel, torque converter or other engine drive input (not shown). In this example, the drive input hub 116 includes splines 118 to join the torque input source to an outer housing 120, which is operatively connected to the driving disks of the first 112 and second 114 clutch disk stacks.

A first clutch output spline 122 is operably connected to the driven disks of the first, outer disk stack 112, and a second clutch output spline 124 is operably connected to the driven disks of the second, inner disk stack 114. In a typical application, the second output spline 124 is keyed to a first outer drive shaft to provide driving torque to preselected gear ratios, such as the gear ratios 26, when the second inner disk stack 114 is actuated. The first output spline 122 similarly is keyed to a second drive shaft that typically is disposed within the first drive shaft. The second inner draft shaft is operatively disposed to transfer driving torque from the first outer clutch stack 112 to the other, typically complimentary gear ratios, such as gear ratios 28.

Thus, the first 112 and second 114 disk stacks are selectively operable upon receipt of control signals from controller 30 to transmit torque to one or more gear ratios 26 or 28 in a transmission 20. In the example shown in FIG. 3, the first and second disk stacks 112 and 114 comprise a plurality of intermeshing clutch disks. The first, outer disk stack 112 includes driving clutch disks 130 mounted in a driving disk support 132. The first disk stack 112 also includes the driven disks 134 disposed between the driving disks 130 and mounted on a driven disk support 136. The outer driving disks 130 and outer driven disks 134 are reversibly, and compressively movable (typically along one or more keyways) when pressure is exerted against the end driving disk 130a, with the exception of the end disk 130b which is typically fixed.

The second, inner disk 114 stack similarly includes driving clutch disks 138 mounted in a driving disk support 140. The second stack 114 further includes the driven disks 142 disposed between the driving disks 140 and mounted on a driven disk support 144. The inner driving disks 138 and inner driven disks 142 similarly are reversibly, and compressively movable (typically along one or more keyways) when pressure is exerted against the end driving disk 138a.

The outer stack driving disk support 132 is attached to a first, outer stack driving plate 146 fixed at one end to the outer housing 120. The opposite end of the outer stack driving plate 146 is fixed to a clutch support hub 148. The outer stack driven disk support 136 is attached at one end to an outer stack driven plate 150, which has the outer stack output shaft spline 122 at its opposite end. The inner driving disk support 140 similarly is attached to one end of an inner stack driving plate 152. The inner stack driving plate 152 is fixed at its opposite end to the clutch support hub 148. The inner driven disk support 144 is attached at one end of an inner driven plate 154, which is in turn fixed at its opposite end to the output shaft spline 124.

Accordingly, when the clutch is in operation, driving torque is transferred through the hub 116 and the outer housing 120 to the outer driving plate 146, and thereby to the first driving disks 130 and the clutch hub 148. The clutch hub 148, in addition transfers driving torque to the inner stack driving plate 152, and thereby to the inner stack driving disks 138.

To actuate the disk stacks 112 and 114, the first outer stack 112 is provided with a first outer piston 156 selectively shiftable from a first unengaged position to a second position engaging the end driving disk 130a. When engaged, the outer piston 156 progressively compresses the outer clutch driving disks 130 and driven disks 134 together to progressively transfer driving torque from the driving disks 130 to the driven disks 134. That driving torque is thereby transmitted by the outer stack driven plates 150 to the outer output shaft spline 122 and its corresponding clutch output shaft. By partially engaging the driving and driven disks 130 and 134, the above mentioned blended, effective gear ratios can be developed.

Likewise, the second inner stack 114 is provided with a second inner piston 158 selectively shiftable from an unengaged position to a position engaging the end, inner driving disk 138a. The inner piston 158 progressively compresses the driving disks 138 and driven disks 142 together transferring driving torque from the driving disks 138 to the driven disks 142 and to the inner driven plate 154 and output shaft spline 124, with its attached output shaft.

The outer piston 156, in addition, separates a first outer pressure apply chamber 160 from a first outer pressure balance or compensation chamber 162. A first, outer plate spring 166 is positioned in the outer balance chamber 162 engaging the outer piston 156. The first plate spring 164 biases the outer piston 156 from its engaged position to its unengaged position.

The inner piston 158 also separates a second inner pressure apply chamber 168 from a second, inner pressure balance or compensation chamber 170. Positioned within the inner pressure compensation chamber 170 are one or more coil springs in a spring carrier 176. The coil springs 176 bias the inner piston 158 from a position engaging the inner clutch stack 114, to an unengaged position.

The piston 156 of the first, outer plate clutch stack is shifted from an unengaged position to a position engaging and compressing the first, outer disk stack 112 by the application of fluid pressure in the pressure apply chamber 160. The fluid pressure is supplied by an increase of fluid flow from an oil pump at the direction of a controller operating a valve 50 as further discussed in connection with FIG. 1. Sufficient fluid is supplied to the pressure apply chamber 160 to increase the fluid pressure within the chamber until the biasing force of the spring 166 is overcome and the piston 156 is moved into engagement with the disk stack pressure plate 130a. Additional fluid is supplied to the pressure chamber 160 to compress the disk stack 112 to provide the desired amount of torque transfer from the driving disks 130 to the driven disks 134.

The second inner 158 piston similarly is actuated by the supply of fluid to the second, inner pressure apply chamber 168 from the oil pump, valve 52 and 30 controller system. Sufficient fluid is supplied to the inner, pressure apply chamber 168 to increase the fluid pressure within the chamber overcoming the biasing force of the coil spring assembly 176. The fluid pressure is increased until the second inner piston 158 is moved into engagement with the inner disk stack pressure plate 138a, and to compress the disk stack 114 to provide the desired amount of torque transfer from the inner stack driving disks 138 to the inner stack driven disks 142.

The first 162 and second 170 balance chambers, in addition, are provided with a fluid flow sufficient to offset the pressures exerted in the outer pressure apply chamber 160 and inner pressure apply chamber 168, respectively, resulting from the centrifugal force exerted on the fluid in the pressure apply chambers 160 and 168. By maintaining a sufficient amount of fluid in each balance chamber 162 and 170, the fluid pressures caused by centrifugal forces in the pressure apply chambers 160 and 168 can be offset by the fluid pressures induced in the balance chambers 162 and 170.

In this example, the clutch 110 rotates about a stationary support hub 186, with a fluid distribution sleeve 188 disposed between the support hub 186 and the clutch output shafts (not shown). The fluid flow for the pressure apply chambers 160 and 168, the balance chambers 162 and 170, and cooling and lubrication paths flow through the sleeve 188 in communication with an oil pump, and the valve system 48 and controller system 30. The fluid flows through one or more fluid channels in the distribution sleeve 188 and through ports in the clutch 146 and support hubs 186 for the supply of fluid to the pressure and balance chambers.

Figure 4:
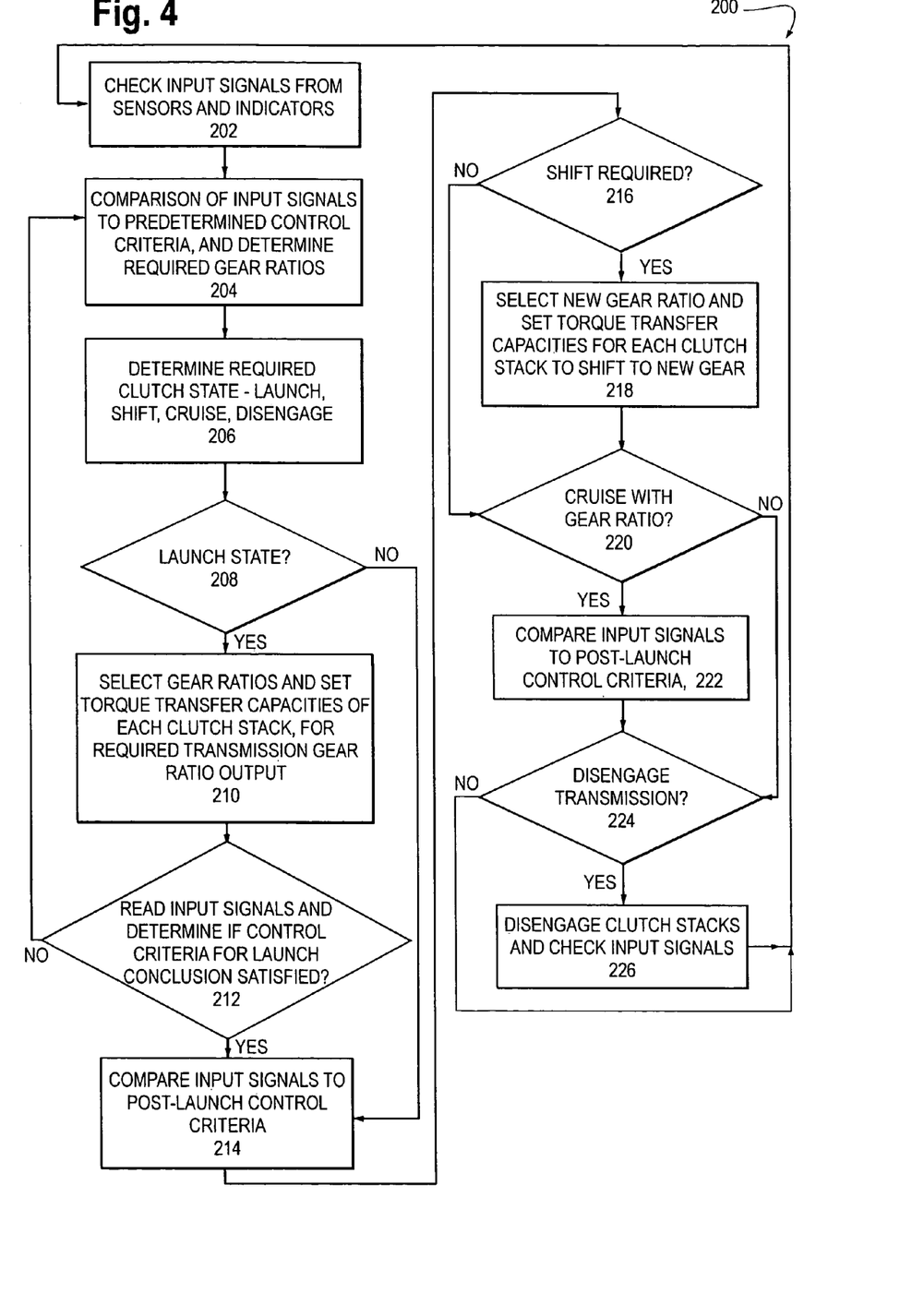
FIG. 4 is a flow chart that illustrates a simple algorithm for controlling the operation of one aspect of the clutch controller of the invention illustrated in FIG. 1.

FIG. 4 is a flow chart for one example of a simple algorithm 200 implementing the control system and method of the invention. The steps carried out by this example of an algorithm 200 are typically carried out in the processor(s) of the control system 30, and represent only a portion of the operations and algorithm (5) used for overall operation of the clutch and transmission systems. In some applications, some aspects of the algorithm or its equivalent in terms of the operation of the multi-clutch system may be carried out in other control systems and/or processors and with the appropriate signals, data or other information conveyed to the control system for the components of the system of the invention.

In this example, the algorithm includes, but is not limited to, the initial step 202 of checking the input signals from the system sensors and indicators, such as sensors reflecting one or more of the following: engine speed and/or torque 34; vehicle speed, vehicle load wheel speed, and/or acceleration 32; throttle position and/or accelerator pedal position 42; clutch slip, clutch output shaft rotational speed, temperature, and/or torque output 36; transmission gear ratio selection, torque output, and/or output shaft rotational speed 38; operator instructions and/or gear ratio selection indicator 46; and other input required for specific applications of the invention.

In this aspect, the input signals are used in the step 204 to determine the desired torque output of each clutch assembly, the desired torque output of the transmission necessary to comply with the operator's instructions and satisfy predetermined control criteria. The predetermined criteria, for example, may reflect the gear ratios available in the transmission; vehicle or driven system load, tire size, differential ratios, and other similar vehicle specific characteristics; the desired range of effective gear ratios provided by the multi-clutch system and associated transmission; the desired acceleration curves and shift timing profiles; desired engine speed ranges and fuel consumption profiles; desired drivetrain torque curves produced by the system; safety criteria such as maximum engine speeds, clutch, transmission and differential temperatures, wheel spin, etc.; and other criteria useful in determining the effective operation of a specific system in terms of performance, efficiency, safety and driving characteristics.

For example, in one aspect, the control criteria of step 204 may include factors such as vehicle load, tire size, optimum engine speed ranges, gear ratios, optimum effective gear ratio ranges, optimum wheel speed, and optimum drivetrain output that may be preferred to maximize fuel efficiency. These criteria also may be designed to provide optimum "shiftiness" for a particular driving style, i.e. maximizing or minimizing the number of shifts at vehicle launch and at other operation stages. Similarly, the control criteria may be designed to address additional goals, such as a highly effective gear ratio at launch providing a high torque output from the drivetrain under high vehicle load conditions.

The control criteria also may incorporate variable standards implemented under different operating conditions. For example, the control criteria may implement different effective gear ratio ranges or changes in effective gear ratios when the system detects changes in the vehicle loading, road conditions or operator directives. In this aspect, the control criteria may be designed to produce a desired drivability characteristic, such as a "sportier" high acceleration rate at launch with a relatively high effective gear ratio until engine speeds exceed a preselected limit, and thereafter a lower effective gear ratio is implemented. Under loaded conditions, the control criteria may specify modification of the effective gear ratio to produce greater transmission torque output at lower engine speeds. Once sufficient vehicle speed is reached, the effective gear ratio is reduced to produce greater fuel economies.

In the next step 206 of this example algorithm, the necessary clutch state is determined from the results of the comparison of the input signals and control criteria 204. In this example, the clutch states are launch (i.e. starting a vehicle or system from rest), shift (i.e. shifting to discrete gear ratios); cruise (i.e. maintaining a desired vehicle and/or wheel speed); disengage (i.e. no torque transfer through the clutch); and park (i.e. the vehicle at rest and/or a parking gear engaged).

If at step 208 the launch state is determined, then in step 210, the necessary gear ratios are engaged with each clutch output shaft or other output from the clutch to the transmission 20, and the torque transfer capacities are determined for each set of clutch friction elements to produce an effective gear ratio that satisfies the control criteria. In this step 210, a control signal also is sent to each set of clutch friction elements to cause their engagement to a degree necessary to produce the desired torque transfer to each gear ratio. As a result, they produce the desired effective gear ratio/torque transfer to the transmission and drivetrain.

In the next step 212 of this example, the input signals from the above mentioned sensors and operator indicators are monitored to determine whether the control criteria are satisfied. If the criteria are not satisfied, then the steps of 204, 206 and 208 are repeated.

If in step 208, the necessary clutch state is not the launch condition, then the next step 214 in this example compares the input signals to post-launch control criteria. Such criteria may be the same, based on or differ from those used in step 204, and this step also typically includes at least a determination of the clutch torque transfer and transmission gear ratio ranges necessary to satisfy those criteria.

If in the next step 216 it is determined that a gear ratio shift is necessary, then the necessary gear(s) are selected for engagement with the output from the sets of clutch friction elements in step 218. The torque transfer capacities of the sets of clutch friction elements also are determined and, in many applications are increased or decreased to make a discrete shift from one gear ratio to the next. As discussed above, by engaging the next gear ratio with an idle set of clutch friction elements, the shift from one active gear ratio/clutch to the next gear ratio may be made quickly and efficiently.

The blending of the clutch stack output and gear ratios, in addition, may be used in step 218. Such a use of the controlled clutch slippage and a range of effective transmission torque/gear ratio output may be desirable to provide a flexible, continuous range of drivetrain torque and vehicle speed at post-launch gear ratio ranges. Such continuous range of post-launch gear ratios also may be used to provide greater torque output to the drivetrain, or other purposes enhancing the system efficiency and driving characteristics.

In the next step 220, it is determined whether the active clutch stack(s) should remain engaged with the active gear ratio(s) to maintain a cruising speed with in a desired range. If yes, then in step 222, the input signals are monitored at desired intervals to determine whether the post-launch control criteria are satisfied. If they are not, then steps 214, 216, 218, and 220 are repeated.

If in step 216 is determined that a shift is not necessary, then the algorithm proceeds to step 220. If in step 220, it is determined that cruise conditions are not required, then in step 224 it is determined whether the clutch assembly should be entirely disengaged preventing torque transfer to the transmission. If based on the input and control criteria, such a determination is made then the clutch assembly is disengaged in step 226, and the steps starting with 202 are repeated.

As mentioned above, other algorithms permitting the control of the clutch torque output from a multi-clutch system and the generation of a range of effective transmission torque output and rotational speed also maybe used. The steps of an algorithm for a specific system typically is customized for the needs and objectives of that system.

Figure 5A:
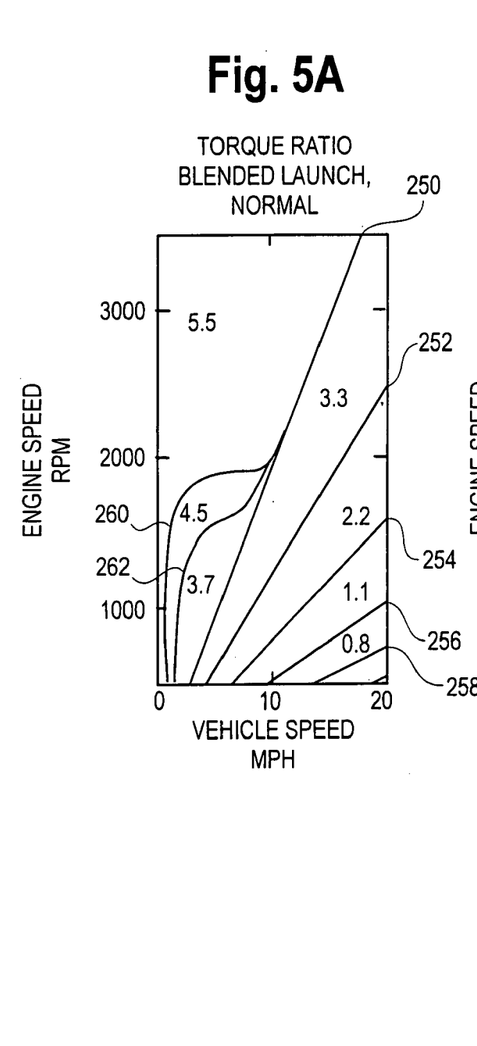
Figure 5B:
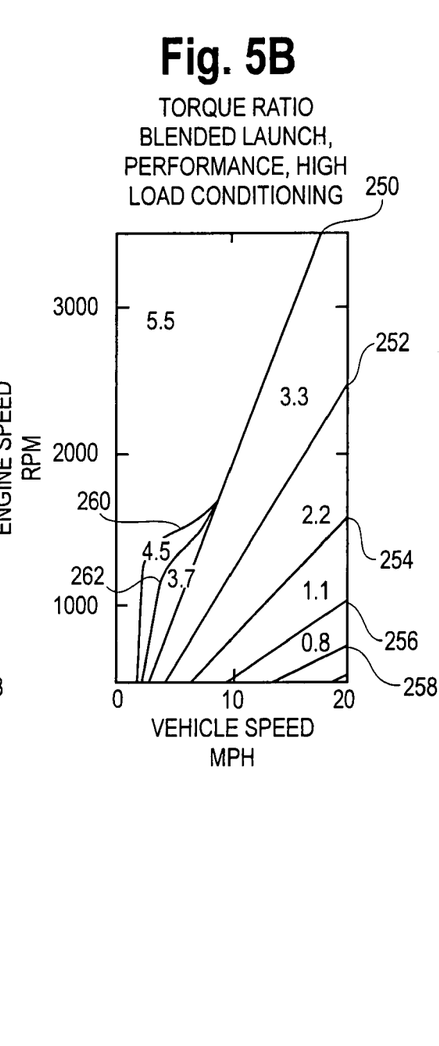
Figure 5C:
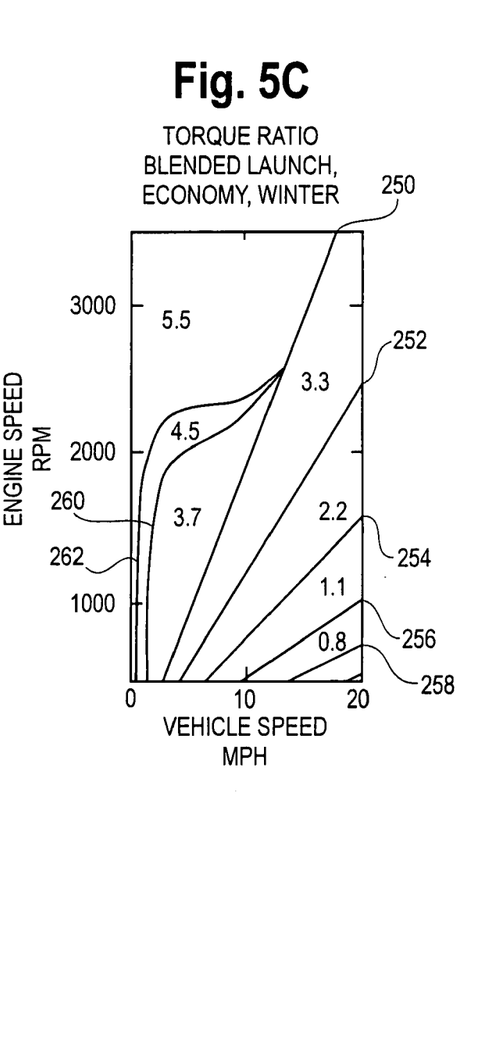

The plots of FIGS. 5a through 5c illustrate the advantages of the system and method of the invention in terms of providing variable effective gear ratio/torque ratios adapted for different driving conditions. In each of the FIGS. 5a through 5c, engine speed (starting at 500 revolutions per minute "rpms") is plotted against vehicle speed starting at rest. The lines 250 through 258 represent gear lines or synchronized speed lines for a fixed ratio transmission, such as that used in a manual transmission.

Each gear line represents different gears, with each gear having successively lower, discrete gear ratios. The gear lines reflect the vehicle speed produced by a clutch fully engaged with that gear for a given engine speed value. Shifting to the next gear (with a lower gear ratio) will result in a drop in engine speed at the same road speed. While the clutch is engaging, the torque ratio through the transmission is also the gear ratio. Hence, these systems will operate at the gear ratios indicated in the region to the left of and between the gear lines for each gear as the clutch is engaging.

Thus, while the first gear is engaging it produces a gear ratio/torque ratio of 5.5, represented by the region to the left of line 250. Similarly, a gear ratio of 3.3 is produce by the second gear as represented by the region to the left of line 252; a gear ratio of 2.2 produced by the third gear represented by the region to the left of line 254; a gear ratio of 1.1 is produced by the fourth gear represented by the region to the left of line 256, and a gear ratio of 0.8 is produced by the fifth gear represented by the region to the left of line 258.

Using the system and method of the invention, the two of the gear ratios, 5.5 and 3.3, represented by the regions to the left of lines 250 and 252, respectively, are used with a dual clutch system such as that discussed above. This system provides a range of effective gear ratios at a vehicle launch as illustrated in FIG. 5a to 5c. In the example shown in FIG. 5a, the effective gear ratios produced by the system and method of the invention is used to launch a vehicle under a normal load.

In such a vehicle launch, the desired engine speed range is from about 1000 to 1500 rpms in view of internal combustion operating efficiencies and fuel economies. In the example of FIG. 5a, the first clutch/first gear is predominant at a gear ratio of 5.5 for a very short period at launch. That gear ratio is maintained until the vehicle reaches a speed where the effective gear ratio may be reduced to 4.5 as that reflected by line 260. This reduction permits the system to maintain the engine speed in the desired range by reducing the contribution from the first clutch/first gear ratio and increasing the contribution from the second clutch/second gear ratio.

As also shown in FIG. 5a, as the vehicle speed continues to increase, the effective gear ratio may be further reduced to 3.7 and below by continuing to increase the contribution from the second clutch/second gear, and decreasing the contribution from the first clutch/first gear. As the vehicle speed continues to increase, the effective gear ratio is reduced to the actual gear ratio of the second 3.3 gear ratio. At that point, the first gear is disengaged, and the second gear ratio is fully transferred. The third gear ratio also may be shifted to the first clutch to prepare for the next gear shift. As shown in FIG. 5a, in addition, if the operator or conditions require a more rapid, less efficient launch, then at high engine speeds the highest 5.5 gear ratio is used until the first gear line is met, and little if any of the blended, effective gear ratios are used.

FIG. 5b illustrates the use of the two blended clutch/gear ratio system shown in FIG. 5a modified for driving conditions under high load conditions, such as under towing conditions, and for conditions which maximize acceleration rather than fuel efficiency, such as for high performance launches. Using the strategies reflected with lines 260 and 262, the first clutch contribution at the higher 5.5 gear ratio is maintained for a longer period of time than in the approach shown in FIG. 5a. The approach illustrated in FIG. 5b provides greater toque input to the drivetrain to compensate for the greater vehicle load and provides greater acceleration. The blended clutch/gear ratio system is employed to provide lower gear ratios as the engine speed returns to the more efficient 1000–1200 rpm range.

FIG. 5c illustrates another application of the system of FIGS. 5a and 5b. In this example, it is desired to reduce the torque to the drivetrain at launch to provide an economy mode to optimize fuel efficiency, or to permit a safe, effective launch under conditions where wheel slip is a concern. The strategy reflected by lines 260 and 262 show that at a typical launch engine speed of 1000 to 1500 rpm, blended clutch ratios are implemented almost immediately to provide an effective ratio of from 4.5 down to 3.3 for most of the initial vehicle acceleration. Moreover, the blended clutch/gear ratios are maintained even at significantly higher engine speeds exceeding 2000 rpms to provide greater fuel economies and reduce the transfer of excessive torque to the drivetrain in poor road conditions.

These examples illustrate several different strategies that may be implemented using the system and method of the invention. The control criteria used to determine the torque transfer capacities of each of the multiple clutch/gear ratio combinations may be selected to provide a single effective torque/gear ratio profile such as one of the profiles illustrated in FIGS. 5a through 5c.

Another approach is to provide control criteria producing multiple effective torque/gear ratio profiles, selected for the specific vehicle operating conditions. For example, control criteria may be developed to permit a control system to alternate between the effective torque/gear ratio profiles illustrated in the examples shown in FIGS. 5a through 5c depending on the vehicle load conditions, fuel economy directives, driving style, etc. The choice of a specific profile would be determined by analysis of sensor data for vehicle loading, wheel speed, engine speed, transmission output, etc.

Yet another aspect of the invention is to permit the vehicle operator to select a preferred effective torque/gear ratio profile, i.e. "sporty", high torque "off road", or fuel efficient "economy" operation mode. In another aspect, the operator is permitted to make a primary selection of an effective torque/gear ratio profile. This profile then is compared to the optimum profile based on preselected ranges of engine speed, wheel speed, torque output or other criteria. When the sensor data indicates that the vehicle is operating outside of the predetermined profile, then the control system implements effective gear ratios that assist in returning the vehicle operation to the desired profile.

In yet another application, the control criteria supplied to the control system includes an anticipated performance model based on, for example, anticipated vehicle speed for certain throttle conditions, or acceleration rates based on engine speed and gear ratio values. The control system uses changes in sensor data to anticipate or project the optimum level of clutch blending/effective gear ratios for the specific vehicle operation conditions. When the sensor data deviates from the expected conditions or model, then the system will provide an optimum effective gear ratio for the changed system.

Similarly, by using models accounting for wheel spin, engine and clutch temperatures, the control system may be able to anticipate and react to changed road or other operating conditions and implement the appropriate blended clutch input and effective torque/gear ratio needed to regain wheel traction before the operator could respond to the changed conditions.

Figure 6:
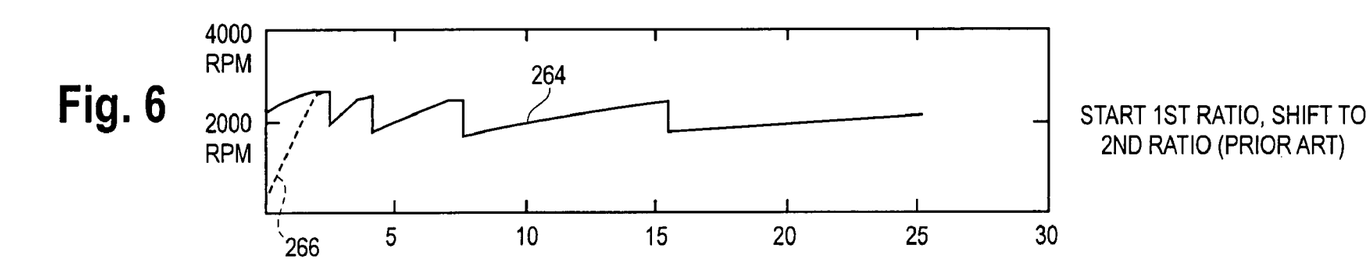
FIG. 6 is a plot of rpms (revolutions per minute) of an engine and transmission output generated using a computer simulation of twenty five seconds of acceleration starting from rest, at 25% throttle, with the prior strategy using a first gear ratio and shifting to a second gear ratio.
Figure 7:
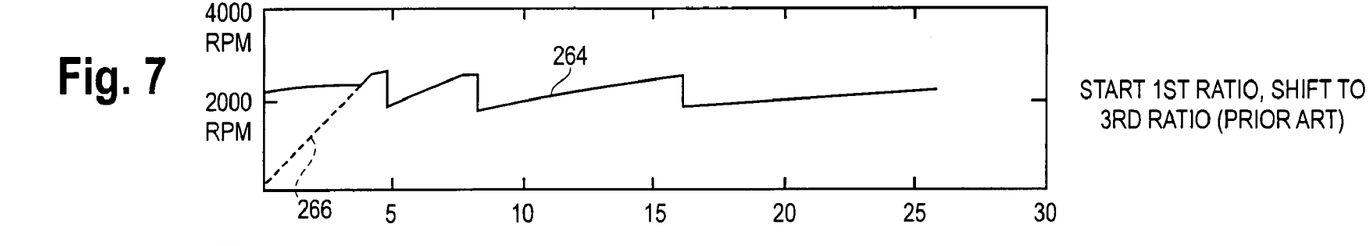
FIG. 7 is a plot of rpms (revolutions per minute) of an engine and transmission output generated using a computer simulation used for the plot of FIG. 5 for twenty five seconds of acceleration starting from rest, at 25% throttle, with the prior strategy starting with the second gear ratio used in FIG. 5 and shifting to a third gear ratio.
Figure 8:
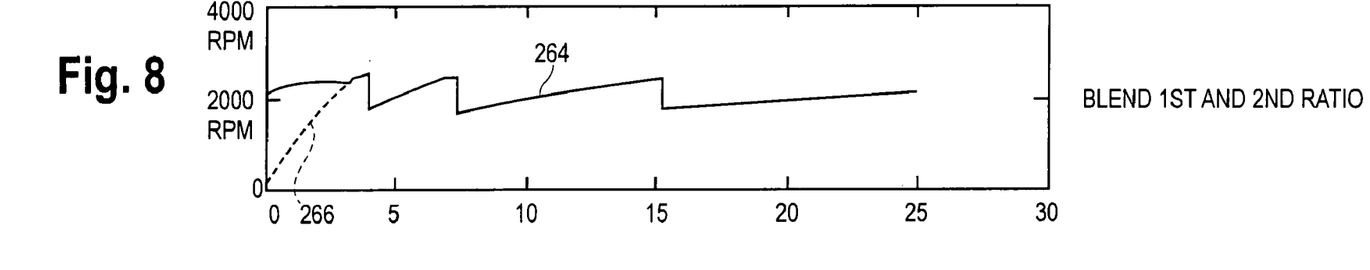
FIG. 8 is a plot of rpms (revolutions per minute) of an engine and transmission output generated using a computer simulation used for the plot of FIG. 5 for twenty five seconds of acceleration starting from rest, at 25% throttle, with the system of the invention using a blend of the first gear ratio and the second gear ratio to produce an intermediate effective gear ratio.

The advantages of the system and method of the invention also is illustrated in the plots of time versus engine and transmission input speed to a drive train of FIGS. 6 through 8. These figures show the changes in engine speed starting at about 2000 rpms, indicated by line 264, for 25 seconds in a simulated vehicle launch. They also show the increased transmission rotational speed, reflected as line 266, to a drive train using different combinations of gear ratios. The slope of the line 266 and its maximum (overlapping engine speed line 264) reflects the maximum vehicle speed at that gear ratio under the specified throttle/engine speed conditions.

The simulation assumed a vehicle weight of 4,500 pounds; an axle ratio of 3.42; a tire size of 650 revolutions per mile; and a starting engine speed of 2000 rpms, representing a 25% throttle level. The simulation also assumed transmission gear ratios of 5.31 (first gear), 3.35 (second gear) 2.16 (third gear), and 1.41 (fourth gear); and differential gear ratios of 5.2, 3.25, 2.16 and 1.43.

FIG. 6 illustrates a typical, prior art, strategy where the launch is started in first gear and is shifted to second gear when the transmission output synchronizes with the engine speed, i.e. the transmission output indicated by line 266 reaches and intersects engine speed line 264. As seen in FIG. 6, the engine speed 264 quickly increases and the transmission output 264 rapidly synchronizes with increased engine speed. The result is at least two shifts before five seconds and at least two significant increases and decreases in engine speed during those first five seconds.

FIG. 7 illustrates a second prior art strategy where the launch is initialized in second gear. In this strategy, there are few shifts, but the engine speed is maintained at a lower level, transmission output speed does not approach the engine speed until almost five seconds has elapsed, and speed and the transmission output speed does not approximate the level shown in FIG. 6 until about five seconds.

FIG. 8 illustrates one application of the system and method of the invention. In this example, the output of two clutch systems, a first system engaged with the first gear and the second engages with the second gear is employed at launch. The transmission output 266, i.e. vehicle acceleration, increases significantly more rapidly than in FIG. 7, and reaches its maximum well before five seconds.

Figure 9:
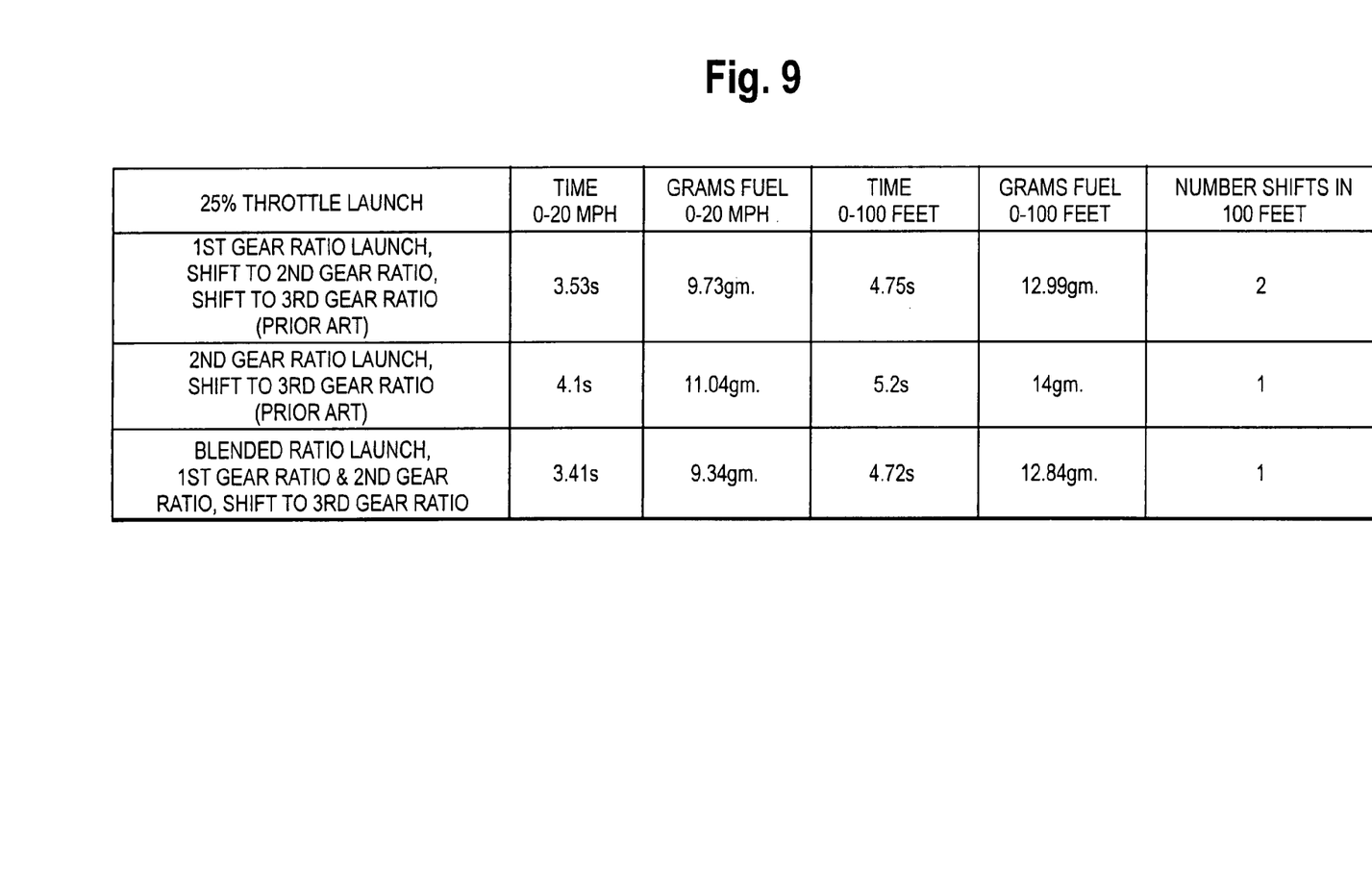
FIG. 9 is a table comparing the results of the simulations of FIGS. 6 through 8 for the variables of time to accelerate from 0 miles per hour to 20 miles per hour, fuel consumed to accelerate from 0 miles per hour to 20 miles per hour, the time required to travel 100 feet, the fuel required to travel 100 feet and the number of shifts required to travel 100 feet.

The advantages of the system and method of the invention also are reflected in the Table, FIG. 9. Using the data collected from the simulations shown in FIGS. 6 through 8, the blended torque/gear ratio strategy of the invention produced a more rapid acceleration from rest to 20 miles per hour than either of the two prior art approaches. This was accomplished with only one shift, rather that the two shifts of the approach shown in FIG. 6, and over 16% faster than the approach shown in FIG. 7 starting in second gear.

The approach of the invention shown in FIG. 8 also used less fuel to reach 20 miles per hour than both of the approaches shown in FIGS. 6 and 7. The blended torque/gear ratio approach obtained a reduction of over 15% in fuel consumed compared to the approach shown in FIG. 7. Similar results are shown in the data for the time and fuel used to reach 100 feet in the simulated launch.

Thus, the inventions use of a multi-clutch system engaged with multiple gear ratios, and the selective engagement of the clutches to provide a variable, blended torque/gear ratio output to a drivetrain provides a flexible clutch and transmission system that provides advantages in driving characteristics, fuel economy and other operation criteria. It further is adaptable to a variety of vehicle launch and operation conditions, desired parameters and operation strategies.

While the invention has been described by reference to certain specific descriptive examples which illustrate preferred materials and conditions, it is understood that the invention is not limited thereto. Rather all alternatives, modifications and equivalents within the scope of the invention so described are considered to be within the scope of the appended claims.

What is claimed is:

1. A clutch system for a driven assembly, the clutch system responsive to external stimuli comprising:
   a plurality of independently operable clutch friction assemblies reversibly engageable to transfer torque from a torque input source to a plurality of transmission gear ratios in operative relation to a drivetrain, at least a first and a second friction assembly in operative relation with a first and a second transmission gear ratio; the transmission gear ratios disposed to combine the torque transferred by each friction assembly providing an effective gear ratio output to the drivetrain; and
   each friction assembly in communication with a control system disposed to signal the simultaneous transfer of an amount of torque through each friction assembly to its associated transmission gear ratio sufficient to produce an effective gear ratio output to the drivetrain within a range defined by the first and the second transmission gear ratios in response to the external stimuli.

2. The clutch system of claim 1 wherein the driven system is an automotive system and the control system is in communication with one or more sensors providing the external stimuli, the sensors disposed to provided data indicative of the condition of the automotive system.

3. The clutch system of claim 2 wherein the control system is provided with a processor programmable with one or more control criteria and in communication with the friction assemblies and the sensors, the processor effective to determine and signal an amount of torque transfer through each friction assembly sufficient to provide an effective gear ratio output satisfying the control criteria in response to data from the sensors.

4. The clutch system of claim 3 wherein the sensors are disposed to provide stimuli reflective of one or more of the following: the speed of the automotive system, the acceleration of the automotive system, the load on the automotive system, the torque input to the friction assemblies, the torque transfer by the friction assemblies, the gear ratio output to the drivetrain, and vehicle operator instructions.

5. The clutch system of claim 3 wherein the processor is effective to determine the torque transfer from each friction assembly necessary to maintain a predetermined acceleration rate established by the control criteria, and to adjust the torque transfer from each friction assembly to provide the predetermined acceleration rate in response to data from the sensors.

6. The clutch system of claim 2 wherein each friction assembly has a plurality of friction elements reversibly engageable to transfer torque from the torque input to the transmission gear ratios; each transmission gear ratio comprising a gear system with a gear ratio differing from the gear ratios of the other gear systems; the effective gear ratio output to the drivetrain transmitted by an output shaft engaged to receive torque from the transmission gear systems.

7. The clutch system of claim 6 wherein the automotive system is an automotive vehicle, and the torque input and the control criteria are effective to launch the vehicle to a desired starting speed using an effective gear ratio that maintains the torque input within a predetermined range.

8. The clutch system of claim 6 wherein the automotive system is an automotive vehicle, and the torque input and the control criteria are effective to launch the vehicle to a desired starting speed using an effective gear ratio that maintains the vehicle wheel speed within a predetermined range.

9. The clutch system of claim 6 wherein the automotive system is an automotive vehicle, at least one sensor is disposed to indicate the load on the drivetrain, and the processor is effective to adjust the effective gear ratio in response to the drivetrain load to launch the vehicle at an acceleration rate selected by the vehicle operator.

10. The clutch system of claim 6 wherein each friction assembly is in fluid communication with a fluid actuator system, the fluid actuator system controlling the engagement of each friction assembly through the application of fluid pressure thereto, and the actuator disposed to receive control signals from the controller system directing the transfer of torque through each friction assembly, the amount of torque transferred by each friction assembly determined by the fluid pressure applied by the fluid actuator, and the effective gear ratio is transferred to the drivetrain through an output shaft;
the processor having a control signal to engage the first gear to receive torque output from the first friction assembly and to simultaneously engage the second gear element to receive torque from the second friction assembly, the torque transferred to the output shaft and the gear ratios effective to provide an output shaft speed effective to provide a predetermined acceleration rate.

11. An automotive clutch system rotatable about a central axis responsive to external stimuli comprising:
a plurality of disk stacks, each disk stack disposed to transfer torque from a torque input to an output shaft;
a pressure chamber associated with each disk stack, each pressure chamber having a fluid supply and a pressure piston, the pressure piston disposed to reversibly engage and actuate the disk stack transferring torque from the torque input to the output shaft when the pressure chamber is pressurized by the fluid supply;
a balance chamber associated with each pressure piston, the balance chamber having a fluid supply, the balance chamber disposed to exert a compensating fluid pressure against the pressure piston in opposition to fluid pressure in the first pressure chamber induced by centrifugal forces resulting from the rotation of the clutch assembly;
each balance chamber in fluid communication with a fluid supply, the fluid supply disposed to provide a gravity assisted flow to the balance chamber under low flow conditions effective to maintain a compensating fluid pressure in the balance chamber offsetting the fluid pressure in the first chamber induced by the centrifugal forces;
each disk stack in communication with a control system disposed to signal the simultaneous transfer of an amount of torque through each disk stack to an associated transmission gear ratio; the amount of torque transferred through each disk stack sufficient to produce an effective gear ratio output to a drivetrain in response to the external stimuli; the effective gear ratio within a range defined by the first and the second transmission gear ratios.

12. The clutch system of claim 11 wherein the clutch system is for an automotive vehicle and the control system is in communication with one or more sensors providing the external stimuli, the sensors disposed to provided data indicative of the condition of the automotive system; and the control system is provided with a processor programmable with one or more control criteria;
the processor in communication with the disk stacks and the sensors, the processor effective to determine and signal an amount of torque transfer through each disk stack sufficient to provide an effective gear ratio output satisfying the control criteria in response to data from the sensors.

13. A method for operating a clutch system for a driven assembly in response to stimuli external to the system comprising the following steps:
providing a plurality of independently operable clutch friction assemblies reversibly engageable to transfer torque from a torque input source to a plurality of transmission gear ratios in operative relation to a drivetrain,
providing at least a first and a second friction assembly in operative relation with a first and a second transmission gear ratio; the transmission gear ratios disposed to combine the torque transferred by each friction assembly providing an effective gear ratio output to the drivetrain;

providing each friction assembly with a control system disposed to signal the simultaneous transfer of an amount of torque through each friction assembly to its associated transmission gear ratio;

providing a signal in response to the external stimuli to each friction assembly indicating the amount of torque to be transferred through the assembly to produce an effective gear ratio output to the drivetrain within a range defined by the first and the second transmission gear ratios.

14. The method of claim 13 wherein the driven system is an automotive system and the control system is provided with one or more sensors supplying the external stimuli, the sensors disposed to supply data indicative of the condition of the automotive system.

15. The method of claim 14 wherein the control system is provided with a programmable processor in communication with the friction assemblies and the sensors, the processor provided one or more algorithms and with control criteria, the algorithm effective to determine an amount of torque transfer through each friction assembly sufficient to provide an effective gear ratio output satisfying the control criteria in response to data from the sensors, and the control system signaling the friction assemblies to provide the required torque transfer.

16. The method of claim 15 wherein the algorithm is effective to determine the torque transfer from each friction assembly necessary to maintain a predetermined acceleration rate established by the control criteria, and to adjust the torque transfer from each friction assembly to provide the predetermined acceleration rate in response to data from the sensors.

17. A method of launching a vehicle to a predetermined wheel speed comprising:

providing a transmission system having a plurality of independently operable friction assemblies and a plurality of gear ratio elements for providing an effective gear ratio output to a drivetrain to accelerate the vehicle;

at launch engaging a first friction assembly in the transmission system associated with a first gear element having a predetermined gear ratio to transmit a majority of torque to the drive train;

at launch engaging a second friction assembly in the transmission system associated with a second gear element having a gear ratio lower than the predetermined gear ratio for transmitting a minority of the torque to the drive train;

providing an effective gear ratio of torque transfer to the drive train that is lower than the first gear ratio and greater than the second gear ratio; and varying the effective gear ratio to accelerate the vehicle at a desired rate determined by an operator or a control system.

* * * * *